Feb. 16, 1960 P. M. LUCAS 2,925,473

REMOTE LINE CONCENTRATOR

Filed Oct. 4, 1957 7 Sheets-Sheet 1

PIERRE M. LUCAS
INVENTOR

By Wenderoth, Lind + Ponack
Attys

REMOTE LINE CONCENTRATOR

Filed Oct. 4, 1957 7 Sheets-Sheet 2

PIERRE M. LUCAS
INVENTOR
By
Wenderoth, Lind & Ponack
Attys

PIERRE M. LUCAS
INVENTOR

By
Wenderoth, Lind & Ponack
Attys

Feb. 16, 1960 P. M. LUCAS 2,925,473

REMOTE LINE CONCENTRATOR

Filed Oct. 4, 1957 7 Sheets-Sheet 4

PIERRE M. LUCAS
INVENTOR

By Wenderoth, Lind & Ponack
Attys

PIERRE M. LUCAS
INVENTOR
By Wenderoth, Lind & Ponack
Attys

PIERRE M. LUCAS
INVENTOR
By Wenderoth, Lind & Ponack
Attys

PIERRE M. LUCAS
INVENTOR

By Wenderoth, Lind & Ponack
Attys

United States Patent Office 2,925,473

Patented Feb. 16, 1960

2,925,473

REMOTE LINE CONCENTRATOR

Pierre M. Lucas, Issy-les-Moulineaux, France

Application October 4, 1957, Serial No. 688,196

Claims priority, application France October 5, 1956

2 Claims. (Cl. 179—18)

Figure 1:
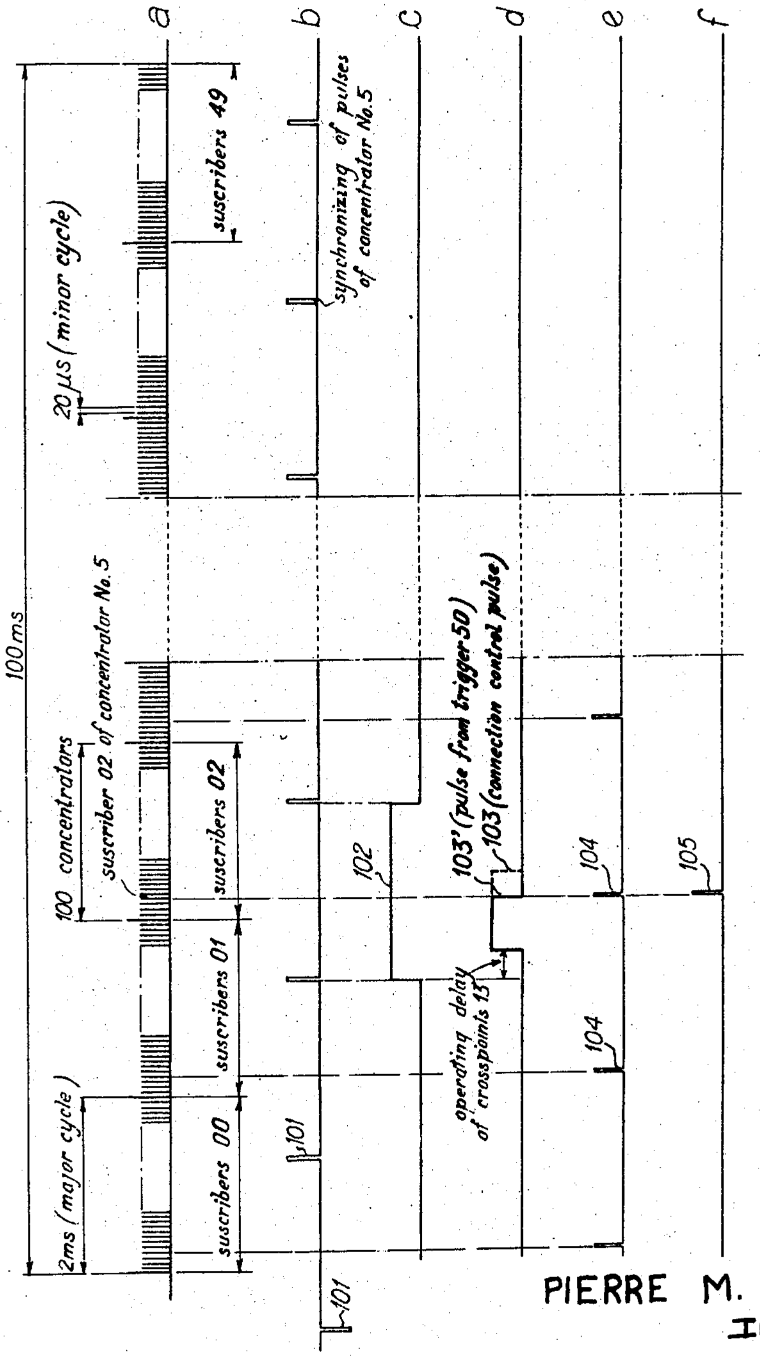

The present invention relates to a telephonic concentrator allowing a number of telephone subscribers to be connected to a central station by a smaller number of trunk lines, and particularly to an electronic switching network in a central office.

This concentrator or concentrating switch may be located in the same building as the central office but it is preferably located remote from the central office adjacent the subscribers and advantageously in the vicinity of the center of gravity of the geographical distribution of the subscribers which it can serve.

In this case, it is connected, by two-wire lines, to a certain number of subscribers' sets, for example fifty, and to the central office switching network, by a number of trunk lines, for example ten, which is smaller than the number of subscribers.

In the standard systems of telephonic switching, devices called "concentrators" are known, which are made in the form of electro-mechanical devices and enable a certain number of subscribers to be connected to a central office by a number of trunk lines which is less than the number of subscribers, but, in these systems, at the point of arrival of the trunk lines at the central office, there is a deconcentration which leads to individual calling and disconnecting relays that are equal in number to the subscribers, so that, for the central office, the subscribers connected to the concentrator are not distinguished from the normal subscribers, the only condition to be complied with being a condition of synchronism in the operation of the concentrator and of the deconcentrator.

An object of the present invention is to construct an electronic concentrator which can be connected to an entirely electronic central station.

Another object of the invention is to use directly, in the central office, the information conveyed by a number of concentrator trunk lines less than the number of subscriber lines without it being necessary to use a deconcentrator for materializing every subscriber's line individually at the exchange.

Another object of the invention is to use, for transmitting to the central station, the signals containing the information relating to the state of all the subscribers' lines connected to the concentrator, a sequential division code in the time such that a fixed time interval in a recurrent cycle is characteristic of a single subscriber.

The remote line concentrator of the invention belongs to the kind of concentrators employing a rectangular switching arrangement of crosspoints having a number of subscriber-line inputs in one co-ordinate and a number of trunk inputs in the other co-ordinate. The crosspoints are gas tubes that pass either talking alternating current signals or direct current signals derived from the feeding voltage of the subscribers' handsets.

Another object of the invention is to utilize, for the transmission of information relating to the subscribers' line service condition towards the switching network of the central office, only the trunk lines which serve for the establishment of communications and to use, for the transmission of information from the central office to the concentrator switching stage, the same concentrator trunks and, in addition, a very limited number of two-wire circuits, the function of which is to transmit, especially, synchronising pulses and signalling frequencies.

Another object of the invention is to provide a concentrator which is without any source of direct or alternating supply, the energy necessary for its operation being obtained by a remote feed on a phantom circuit constituted by the two-wire circuits the function of which is to transmit the synchronising pulses and the signalling frequencies.

Another object of the invention is to transmit to the central office the signalling of a calling subscriber's line only after this line has been connected in the concentrator to an available trunk line; this eliminates the necessity of searching for the calling line and of denoting the trunk line which should be allocated to the communication.

Another object of the invention is to effect the connection, to the exchange, of a called subscriber's line by transmitting, on a selected concentrator trunk, a connecting pulse at a time interval fixed within the recurrent cycle.

The principle of the concentrator will now be given.

Hereinafter, the details of the operation of the electronic central office will not be described; it will be sufficient to describe briefly the principles of its construction and the members which are brought into operation in direct connection with the concentrator.

There will be taken, as a non-limitative example, a central station which can serve five thousand subscribers supposed to be distributed over a hundred concentrators at the rate of fifty subscribers per concentrator, each concentrator being connected to the electronic central station by ten trunk lines; this makes a total of a thousand trunk lines leading to the central station.

It will also be assumed, in order to fix one's ideas, that the connection elements of the central station are distributed in rectangular switchboards in accordance with a structure similar to that of the crossbar systems with, for example, six selection stages in cascade distributed in two groups of three stages, the first group of these selection stages, called "incoming line link," which enables every one of the thousand incoming trunk lines to be connected to any one of eight hundred or a thousand intermediate members hereinafter, for the sake of simplicity, denoted by the term "junctor," and the second group of three selection stages, called "outgoing line link," which enables any one of these junctors to be connected to any one of the thousand outgoing trunk lines.

Without prejudging the physical nature of the cross-points entering the constitution of these selection stages that are inside the central office, it will be assumed only that it is possible to produce an end-to-end connection by marking potentials onto the incoming trunk line, the junctor and the outgoing trunk line selected by any suitable means. It will also be supposed that the cross-points are capable of assuming two well defined physical states, one in which the transmission of the audio frequencies and frequencies of up to about 20 kilocycles per second is possible without any appreciable attenuation and the other in which every transmission is considerably attenuated so as to obtain a sufficient diaphonic attenuation.

The principle of the concentrator is to allot, to each of the fifty subscribers which are connected thereto, a time interval in a recurrent cycle, the total duration of which is, for example, a hundred milliseconds.

This recurrent cycle (Fig. 1, line *a*) is divided into fifty major cycles, each having a duration of two milliseconds and being respectively characteristic of the subscribers No. 00, No. 01, No. 02 . . . No. 49 of the hundred concentrators. Each of the fifty major cycles is, in turn, divided into a hundred minor cycles, each having a duration of twenty microseconds and being respectively characteristic of the first, second, etc. hundredth concentrator.

Consequently, a minor cycle constitutes a time interval which is characteristic of a particular subscriber of the exchange, the number of this minor cycle fixing the concentrator and the number of the major cycle to which it belongs fixing the number of the subscriber in the concentrator to which he is connected. Thus, there will be allotted to the subscriber No. 02 of the concentrator No. 5, in the concentrator, the time interval constituted by the third major cycle and, in the electronic central office, the time interval constituted by the fifth minor cycle of this third major cycle.

This division of the time into major cycles renders it possible to keep a rather coarse time division in the concentrating-switch stage and does not necessitate the employment of pulses of very short duration within said stage, the fine time division being transferred into the electronic central office itself, the circuits of which can be more easily supervised.

The concentrator comprises essentially a rectangular switching arrangement or matrix which will hereinafter be assumed to be of the same nature as those of the selecting stages of the central switching network, a pulse generator synchronized to the operating rate of the central office switching network and generating subscriber-identification pulses at suitable time-positions over a total of fifty members which will be called "gates," each being allotted to a particular subscriber of the concentrator. The function of these gates consists essentially in allowing to pass or in blocking signalling pulses and frequencies, according to the service condition of the subscriber line and according to the state of the crosspoints which have been allotted to said line in the concentrator.

When a subset is off-hook, the microphone feed current, which flows in the line, modifies the characteristics of the gate relative to this subset, so that pulses of great amplitude derived from the subscriber-identifying pulses supplied by the pulse generator can be propagated to the connecting rectangular matrix.

The effect of these pulses of high amplitude, which will hereinafter be called "one-sided connecting pulses," is to allow one of the crosspoints associated with the subscriber line to be operated, that is to say to obtain a path of negligible attenuation between the line of the subscriber and one of the trunk lines going to the central-office switching network.

The operation of the crosspoint produces a double action: it again modifies the characteristics of the subscriber gate in such a manner that all the signallings in the direction of the central office are blocked and, on the other hand, it produces on the corresponding trunk line the transmission, to the central office, of a pulse which will hereinafter be called "connection control pulse" and which enables the central office, by analysis of the time interval of this pulse, to know the number of the subscriber's line which has just been connected into the concentrator and to connect the trunk line, which has just been engaged, to a sender device. The trunk-line circuit at the central office then transmits a dial-tone signal to the subscriber for the purpose of inviting him to dial his number.

During dialling, breakdowns of the subscriber loop occur; the interruption of the microphone feed current produces, in cadence, modification of the characteristics of his gate which are such that, during the period of the breakdowns of the loop, a special frequency signal called "loop frequency" is transmitted through the connecting rectangular matrix and to the selected trunk line in the direction of the central office. This loop-frequency signal, when detected by the trunk-line equipment, enables the central office to register the number of the called subscriber.

When the subscriber replaces his handset at the end of the communication, the same signal at the loop frequency is transmitted and analyzed in the same manner by the central office. After a certain interval, the central office, recognizing that there has been a replacement of the handset, releases the connection as will be seen hereinafter.

When the central office has received a number of digits that are sufficient for making the connection between the incoming trunk line and an outgoing trunk line, it proceeds to make this connection by operations which will not be described herein. The calling subscriber can hear all the tones which inform him of the result of his communication, e.g. an audible ringing tone, a busy tone, automatic anouncers etc., and, finally can enter into conversation with his correspondent when the latter lifts his receiver.

If the correspondent is the first to replace his handset at the end of the communication, the calling subscriber hears the busy tone which invites him to replace his receiver also.

No operation is produced during the whole of this time in the concentrator of the calling subscriber.

When the calling subscriber replaces his handset, the loop-frequency signal passing through his gate and detected in the trunk-line equipment signals to the central office that it should proceed to the release of the line. One will not concern himself herein with the manner in which the central office releases the internal selection stages which have been used for the communication but only with disconnection of the concentrator. To do this, the central office transmits over the trunk line pulses of high amplitude called "disconnecting pulses" which produce the release of the crosspoint used in the concentrator.

After the release, the characteristics of the subscriber's gate have again been modified and the gate is anew in a waiting position which will be called "idle condition." In this condition, the gate allows the passage, in the directon of the connecting rectangular matrix, of pulses of low amplitude coming from the identifying pulse generator and located in the time interval that is characteristic of the subscriber's line in his concentrator. These pulses, the amplitude of which is about half of that of the one-sided connecting pulses, are insufficient by themselves for unblocking the crosspoints associated with the line of the subscriber. They will hereinafter be denoted by the name "two-sided connecting pulses." It will hereinafter be seen that these pulses, which are in synchronism with other two-sided connecting pulses of the same nature but of opposite polarity and coming from the central office, serve for effecting the connection of a particular subscriber's line for the arriving communications.

When the central office desires to effect the connection to a particular called subscriber's line, which is assumed to be idle, it produces on all the free trunk lines the transmission of a two-sided connecting pulse which is similar to that supplied by the gate of the called subscriber but of opposite polarity. This pulse, being transmitted in the time interval which is characteristic of the called subscriber, is therefore in synchronism with that which comes from the gate. The simultaneous presence of these two two-sided connecting pulses of opposite polarities has an effect which is identical with that of a single one-sided connecting pulse, that is to say, it produces the operation of the crosspoint of the rectangular matrix which is at the crossing point of one of the trunk lines and of the line of the called subscriber. As before, the operation of this crosspoint produces a double action; it produces on the corresponding trunk line the transmission, to the central office, of a connection control pulse which enables it to know the number of the trunk line which has been selected and consequently, to proceed to the making of the connection to the internal selection stages and, on the other hand, it produces a modification of the characteristics of the subscriber's gate. The result of this is to allow the passage, to the central office, of the signal at the loop frequency. The stoppage of this loop-frequency signal is subsequently detected as characterizing the lifting of the receiver by the called subscriber.

Simultaneously, the trunk equipment engaged in the central office transmits two characteristic signalling audio frequencies: on the one hand, in the direction of the set of the called subscriber, the ringing tone signal which produces the operation of its acoustic ringing and, on the other hand, in the direction of the trunk equipment connected with the calling subscriber, a continuous frequency called "ringing supervisory frequency" of return of call, the function of which will be to enable the trunk equipment of the caller's end to be informed through the internal selection stages of the central office, of the moment at which the called subscriber lifts his handset and, consequently, to proceed to all the operations that are useful at that moment, in particular to the pricing; which operations will not be described herein. This frequency will not be used on the lines which are not to give rise to pricing.

As the lifting of his handset by the called subscriber modifies the characteristics of his gate in a direction such that all signalling is blocked, the stoppage of the loop-frequency signal which results therefrom is interpreted by the trunk-line equipment which stops the transmission of the signalling frequencies.

Figure 2:
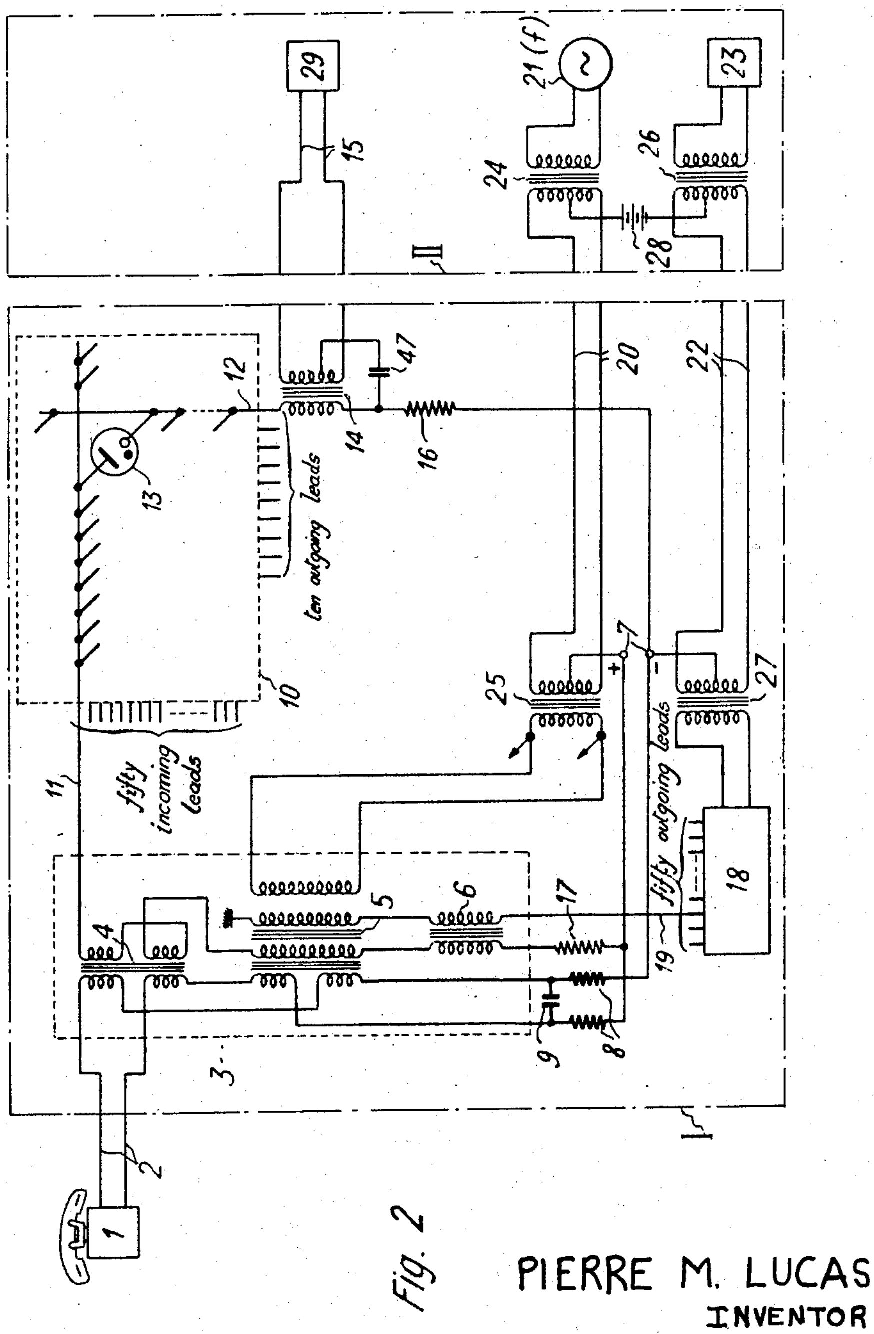
Figure 3:
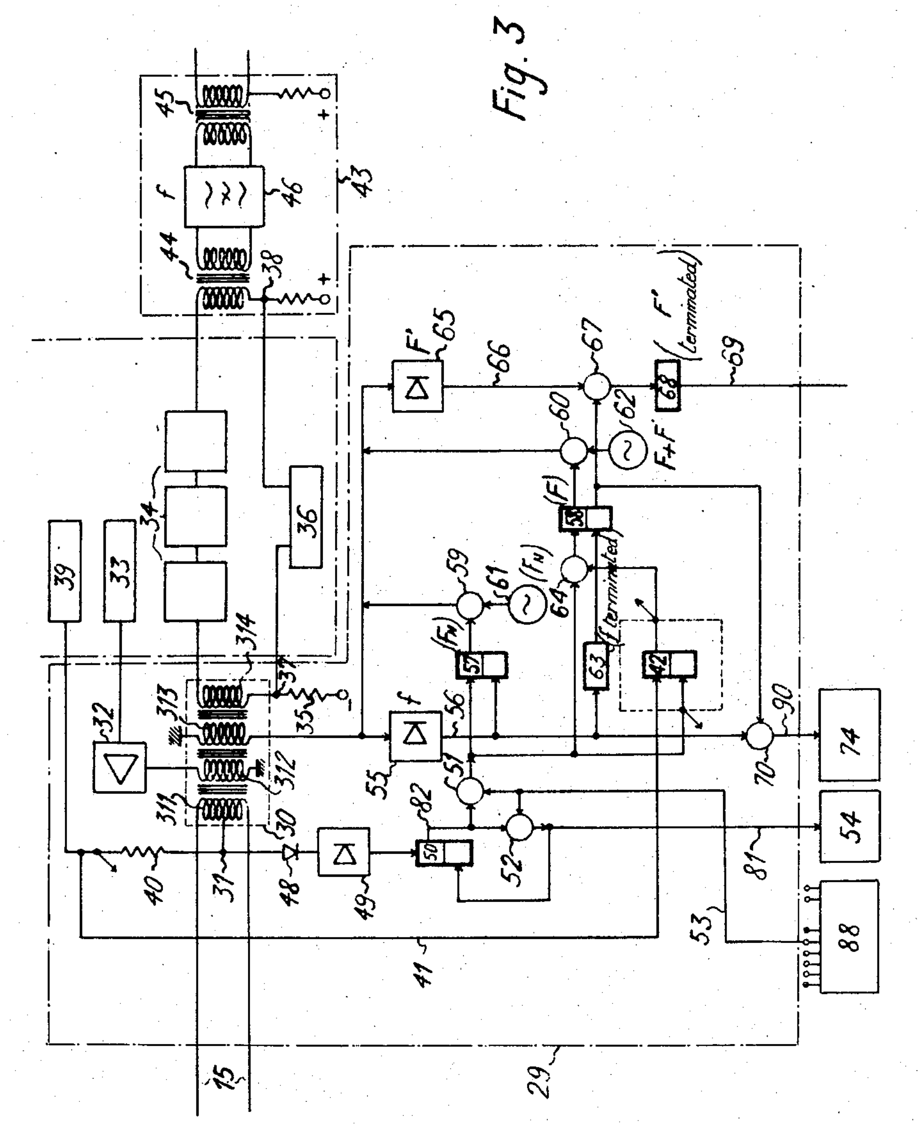
Figure 4:
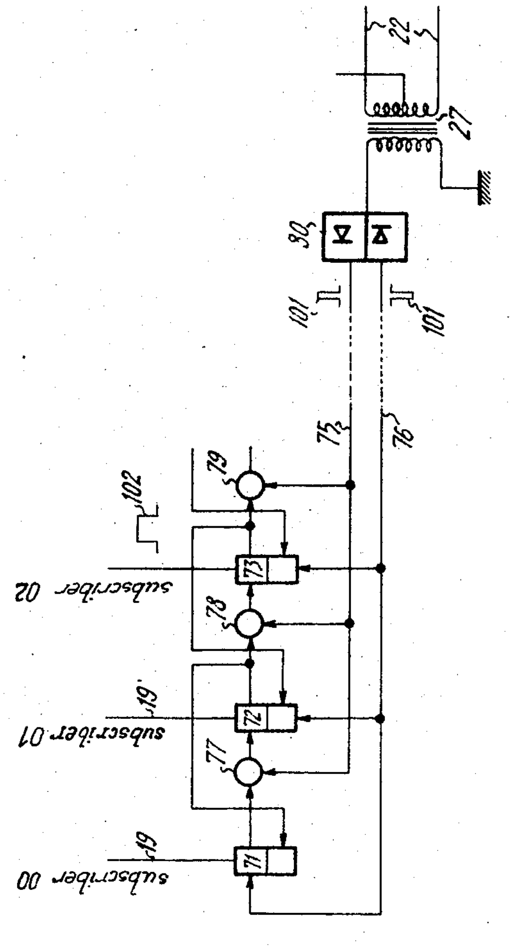
Figure 5:
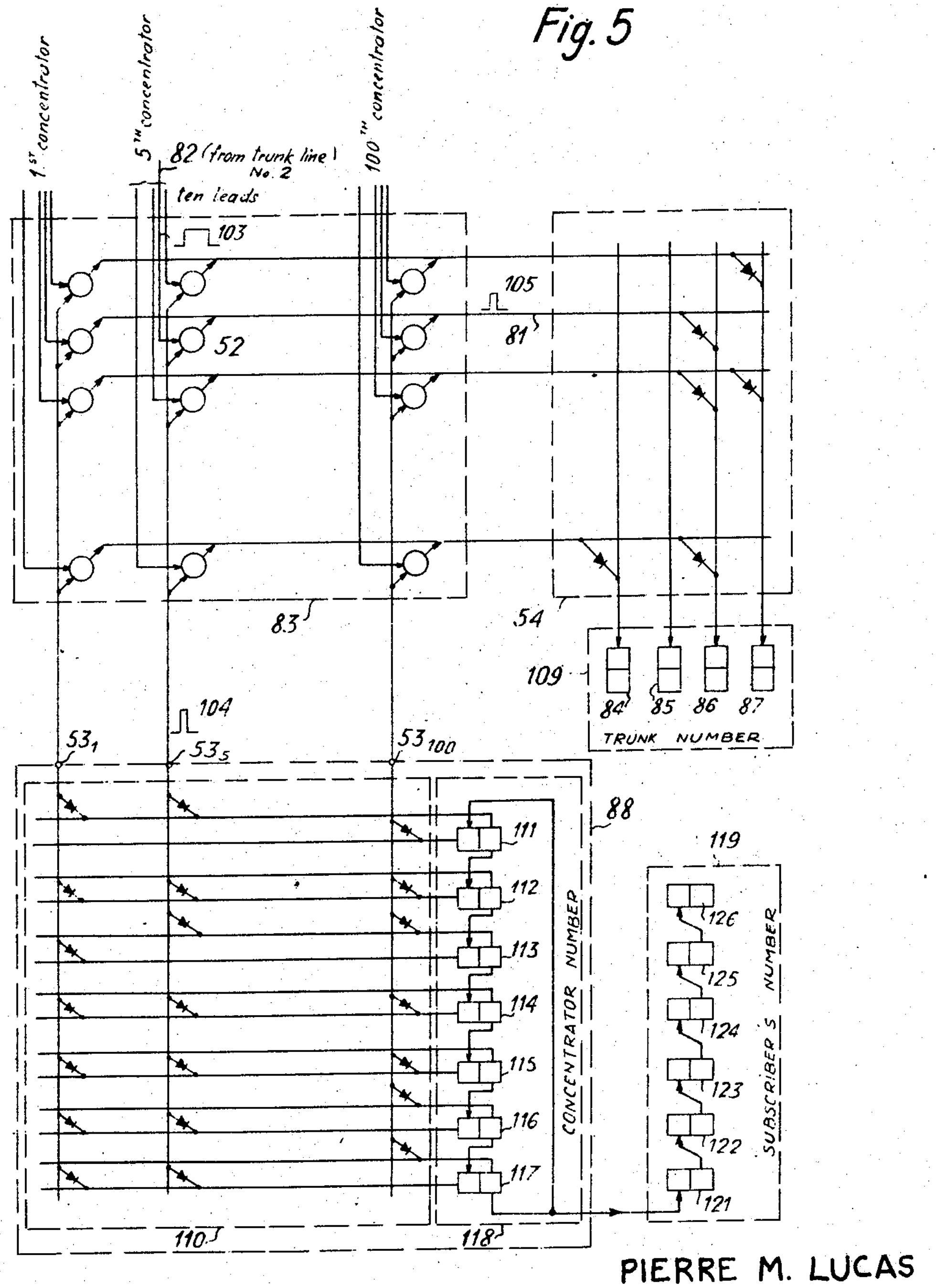
Figure 6:
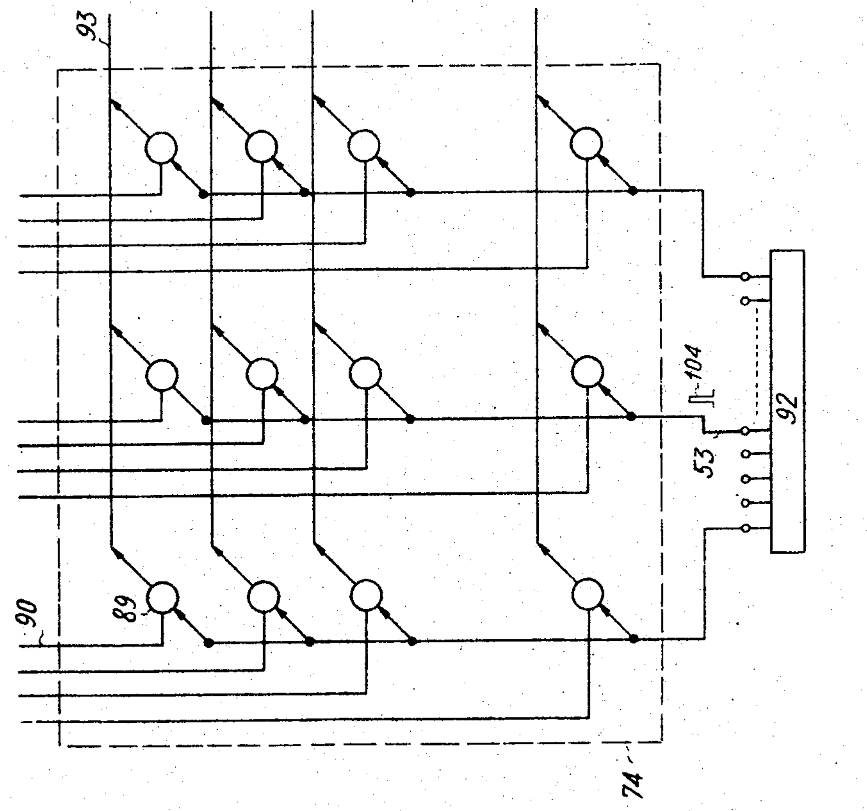
Figure 7:
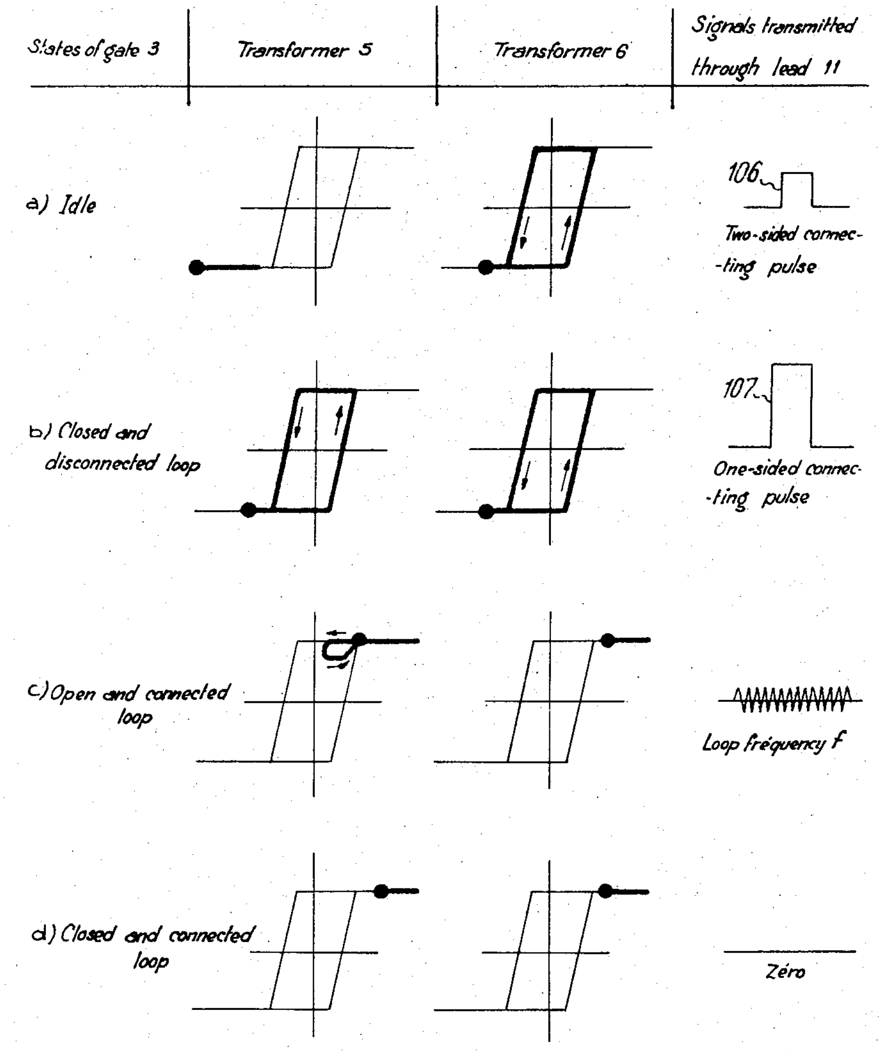

Other objects and features of the invention will appear in reading the detailed description which will now be given of a particular non-limitative embodiment with the aid of the accompanying drawings, in which:

Fig. 1 is a pulse diagram which has been explained partly hereinbefore,

Fig. 2 represents diagrammatically the concentrator connected with a single subscriber's line and a single trunk line, Fig. 3 represents a trunk-line equipment at the central office connected with certain members of the central office represented diagrammatically, Fig. 4 represents the synchronized pulse generator which forms part of the concentrator, Fig. 5 represents a scanning device which forms part of the common members of the central office and enables the latter to obtain all the information which enables it, when a connection takes place in a concentrator, to identify, at the same time, the number of the subscriber's line and the number of the trunk line concerned, Fig. 6 represents another scanning device which enables the central office to know at any moment the service condition of a subscriber's line that is connected to a particular trunk circuit and, consequently, to deduce therefrom the numbers dialled by the subscriber or to detect the replacement of the receiver by the subscriber, and Fig. 7 represents diagrams which explain the operation of the gates associated with every subscriber in the concentrator.

It will be recalled that it has been assumed that the concentrator is connected, on the one hand, to fifty two-wire susbcriber lines and, on the other hand, to the central office by means of ten two-wire trunk lines. In addition, two two-wire auxiliary circuits also connect the central office to the concentrator, one conveying synchroniizng pulses and the other the loop-frequency signal coming from the central office.

The phantom circuit formed by these two auxiliary circuits is used for the remote feeding, with direct current, of the concentrator which is assumed to be located at a certain distance from the principal central office.

Referring to Fig. 2, I denotes the concentrator and II denotes the central office. 1 denotes one subscriber's subset of fifty such subsets. It will be assumed that the subscriber in question is No. 02 of the concentrator No. 5. This subscriber's subset is connected by the two-wire line 2 to the gate 3 which comprises a balanced low-frequency transformer 4 and two saturable-core transformers 5 and 6. The supply of microphone current of the subscriber's subset is obtained from the remote-feed phantom circuit, the terminals of which are represented at 7, through resistors 8 and the primary windings of the transformers 4 and 5. The condenser 9 closes the circuit for the audio frequencies.

The rectangular switching arrangement 10 comprises fifty incoming leads such as 11 and ten outgoing leads such as 12. At the crosspoint of two incoming and outgoing leads is the connection element 13, only one of which is represented in the figure, although there are five hundred for the whole of the rectangular switching arrangement. This crosspoint has here been assumed to be constituted by a cold-cathode gas tube, but it is quite obvious that the man skilled in the art can devise a number of modifications that utilize other devices having similar properties, the said modifications forming part of the scope of the present invention. The outgoing leads such as 12 lead, to the primary winding of transformer 14, the secondary winding of which is connected to one of the ten trunk lines such as 15 and are finally connected through a load resistor 16 to the negative pole of the remote-feed source.

On the other side, the ingoing leads such as 11 lead to the series connected secondary windings of the transformers 4, 5 and 6, and are connected through a resistor 17, to the positive pole of the remote-feed source.

The saturable-core transformers 5 and 6 possess secondary windings which receive, in series, the subscriber-identifying pulses coming from the pulse-generator 18 in the time interval that is characteristic of the subscriber, through the intermediary of one of the fifty outgoing leads, such as 19, of this generator.

Two subsidiary two-wire lines 20 and 22 connect the concentrator to the central office. The line 20 conveys the signal having the loop frequency $f$, which is produced by the oscillator 21 that is common to all the concentrators that are connected to the central office switching network. The line 22 conveys the synchronizing pulses that are produced by the pulse-generator 23 which is likewise common to the whole central office. These synchronizing pulses are transmitted with a repetition frequency of 500 c./s.; they coincide with the commencement of each minor cycle which relates to the concentrator considered (pulses 101 of Fig. 1) but may be time-displaced in advance by a period which is equal to the to-and-fro propagation of the pulses between the central office and the concentrator. The transformers 24, 25, 26 and 27, which are placed on the subsidiary lines 20 and 22, are used for constituting the remote feed phantom circuit between the battery 28 located at the central office II and the terminals 7 used in the concentrator I.

The trunk lines, such as 15, lead to the switching network through an individual line equipment 29 which is described with reference to Fig. 3. Before proceeding to the description of that figure, various drawing conventions will be made.

A rectangle comprising a medial line of separation represents a bistable trigger; the reference numeral of this trigger is written in the upper half of the rectangle. The trigger is assumed to pass into the corresponding condition when a trigger-pulse arrives through the connections leading to this upper half; the trigger is then assumed to act upon the outgoing connections which are connected to the same upper half. When a trigger pulse arrives through the connections leading to the lower half, the trigger passes into the other condition of equilibrium and is then assumed to act upon the outgoing connections connected to the lower half. Return to the condition of equilibrium referred to takes place on applying a trigger pulse through one of the connections leading to the upper half of the rectangle.

A gate circuit is represented by a circle to which lead two ingoing connections and from which a number of connections may leave. There is a signal on the outgoing connections only when there is, at the same time, an effective signal on the two ingoing connections. According to the nature of the ingoing signals, the signal obtained on the outgoing connection or connections may be the part that is common to two pulses or an output alternating signal available during the time in which the control connection is transmitting an effective signal.

A square which comprises within it the symbol of a rectifier, represents a detector. This may, according to the case, be a detector tuned to a given frequency or a pulse-detector for amplifying pulses and regenerating the wave form thereof, if distorted, in order to produce well calibrated pulses for the triggering of triggering circuits.

The nature of the other rectangles represented in the figure is explained in the text or in other figures. They are, in general, devices which belong to the calculating part of the central office and which will not be described in detail herein.

Referring to Fig. 3, the equipment of one of the ten trunk lines that are connected to the concentrator comprises a transformer 30 having four windings. The primary winding 311 is connected to the trunk line 15 and its middle point 31 is tapped. One of the secondary windings 312 is connected, through a power amplifier 32, to a pulse-generator 33 which forms part of the inside of the central office. The function of this generator is to transmit, under the control of the central office, the positive disconnecting pulses which produce the release of the crosspoints both on the concentrator side and the side of the internal-selection stages.

Another winding 313 of the transformer 30 is connected to a set of frequency detectors and of signalling transmitters which will be described hereinafter.

The last winding 314 of the transformer 30 is connected, on the one hand, to the internal selection stages 34, assumed to be three in number, and, on the other hand, to the negative pole of the battery through a resistor 35.

The rectangle 36 represents the part of the central office for marking the ends of a path to be connected through the internal selection stages 34 and for producing the connection by applying negative two-sided connecting pulses to the points such as 37 and positive two-sided connecting pulses to the points such as 38.

The rectangle 39 represents the part of the central office for marking a particular concentrator, i.e. the concentrator in which a called subscriber is to be found, and for producing, in the time interval characteristic of this subscriber, in his concentrator, the transmission of negative two-sided connecting pulses which will have the effect of producing, in synchronism with the positive two-sided connecting pulse transmitted at that instant through the subscriber's gate in its idle condition, the operation of one of the crosspoints associated with the line of the called subscriber. The negative pulses transmitted by the generator 39 are applied through resistors such as 40 to the taps 31 of the primary windings of the ten trunk lines of the concentrator but they could be effective only on those which have not already been connected at their ends. In addition, they are transmitted by the connection 41 to a trigger 42 which corresponds to a given concentrator and is common to the ten trunk circuits such as 29 connected to said concentrator. The function of this trigger 42 is to keep the memory of the fact that a two-sided connecting pulse has just been transmitted by the central office in the direction of a subscriber connected to the concentrator to which corresponds said trigger.

The junctor 43, which is located between the group of three internal selection stages 34 to which it is connected by the transformer 44 and the symmetrical group to which it is connected by the transformer 45, comprises, in addition to testing circuits (not shown, because they take part only in the internal operation of the central office), a band-stop filter 46 which prevents the loop frequencies transmitted by the gates of the subscribers from being propagated outside the half of the central office which interests them. These frequencies, which, in fact, serve for the supervision of the condition of the subscribers' loops, should not be mixed.

The detection and signalling transmission devices associated with the trunk-line circuit 29 will now be described.

When one of the crosspoints 13 comes into operation in the concentrator, it produces the passage of a current of a few milliamperes in the connection leads 11 and 12 in series, then a sharp rise in the potential at the terminals of the resistor 16 of Fig. 2. The condenser 47 transmits this rise in potential in the form of a positive connection-control pulse to the two wires of the trunk line 15 in parallel and this positive pulse, which is picked up at the tap 31, crosses the diode 48 and leads to the pulse-detector 49 which, after having regenerated it, uses it to trigger the trigger-circuit 50. In its operated condition, this trigger circuit opens the gates 51 and 52 in order subsequently to allow a pulse 104, coming from a common generator 88, to pass. The pulse 105, which, at this moment, leaves the gates 52, is applied, on the one hand, to a scanning circuit 54 through the lead 81 (circuit 54 will be described hereinafter) and, on the other hand, resets the trigger circuit 50 to its condition of rest, then closing the gates 51 and 52. The pulse (also 105), which, at this moment, leaves the gate 51, has a number of functions, one of which is to restore to rest the common memory trigger 42 in the case in which the said trigger had originally been put into operation by the transmission of a two-sided connecting pulse by the generator 39.

When a signal having the loop frequency $f$ and coming from gate 3 of the subscriber connected to trunk 15 arrives at the transformer 30, it is detected by detector 55 which is tuned to the said loop frequency and which converts it into a direct current potential applied to lead 56.

The two trigger circuits 57 and 58 control respectively the gates 59 and 60, to allow the passage of the dial tone frequency signal $F_N$ produced by the common generator 61 and of the ringing frequency signal F and ringing supervisory frequency signal F' both produced by the common generator 62.

Trigger circuit 57 is operated when the pulse 104, which is produced by the generator 88 on the wire 53, passes through the gate in consequence of the presence of a pulse 103 at the output of the trigger circuit 50, that is to say, at the time when the crosspoint 13 is operated and connects a calling-subscriber line. It is reset to its condition of rest when a direct current potential appears on the lead 56 in consequence of the detection of the signal having the loop frequency, that is to say when the first dialling pulse from the calling subscriber occurs. When the line being connected is a called-subscriber line, the handset of the subscriber is still on-hook, and consequently forms a loop that is still open. Thus a direct potential is present on lead 56, and trigger circuit 57 does not operate. As a result, trigger circuit 57 operated characterizes the connection of a calling-subscriber line.

Device 63, which comprises a differentiating circuit and a rectifier circuit, has the function of detecting the end of reception of the signal having the loop frequency. The differentiating circuit, which receives the direct current potential through the lead 56, gives, for example, a positive fine pulse at the commencement of the detection of the signal having the loop frequency and a negative fine pulse at the end; the rectifier circuit eliminates the positive pulse and allows only the end negative pulse to pass.

Trigger circuit 58 is operated by the pulse 105 which leaves the gate 51, that is to say at the time when crosspoint 13 is operated, on condition that gate 64 be open, that is to say when trigger circuit 42 is operated because the line connected is a called-subscriber line. Thus trigger circuit 58 operated characterizes the connection of a called-subscriber line.

Trigger circuit 58 is reset to rest by the pulse which leaves device 63 at the end of the signal having the loop frequency, that is to say, at the time when the called subscriber lifts his handset, then stopping the transmission of said signal at his gate 3.

The ringing supervisory frequency F', an uninterrupted frequency (having no silent and ringing successive intervals), travels from the trunk line circuit 29 connected to the called subscriber through the selector stage 34, the junctor 43 and a second selector stage (not shown), to the trunk line circuit 29 connected to the calling subscriber. In said last circuit it is detected by the detector 65 which is tuned to its frequency and which, like the detector 55, converts it into a direct current potential on the wire 66. If trigger circuit 58 is at rest, which happens in the case of the trunk line circuit connected to the calling subscriber, the gate 67 transmits this uninterrupted signal to the circuit 68 which is quite similar to the circuit 63. Consequently, when the called subscriber replies, the transmission of the frequency F' by the trigger circuit 58 of the trunk line circuit which is connected to him being stopped, the end of the detection of this frequency in the trunk line circuit connected to the calling subscriber will produce, on the wire 69, the transmission of a pulse which will be used by circuits (not shown) which interest only the central office for any useful purpose, especially for charging the caller.

The direct current potential applied by the detector 55 to the wire 56 is also sent, through wire 90 and gate 70, to a scanning device 74 which will be briefly described hereinafter. This gate 70 is open when the trigger circuit 58 is at rest, in other words during the opening of the loop due to dialling and or when a calling or a called subscriber hangs up at the end of the communication.

Fig. 4 represents the principle of the operation of the pulse generator 18 relating to the fifth concentrator. It is constituted by a series of fifty trigger circuits 71, 72, 73, etc., each of them supplying subscriber-identifying pulses 102 in the appropriate time intervals to the wires such as 19 in the direction of the transformers 5 and 6 of the subscribers' gates. In Fig. 1, the pulse 102 of the line *c* relates to subscriber No. 02. It is seen that it does not coincide with the time reserved for subscriber No. 02 (time marked "subscriber No. 02" on line *a*). This non-coincidence takes place in order to take into account the time of propagation of the connection-control pulse and the delay of operation of the crosspoints.

The synchronizing pulses of a recurrent cycle are composed of a train of forty nine fine pulses 101 of the same polarity for example positive, and of a negative pulse 101 for ensuring the resetting of the trigger circuit ring to the initial position of the cycle. They are received at the output of the transformer 27 by a directional coupling device 80 composed of diodes for directing the positive pulses to the step-by-step trigger connection 75 and the negative pulses to the reset connection 76.

If it is assumed, in the first place, that only the trigger circuit 71 corresponding to the first subscriber is in operation, a positive pulse is then found on the connection 19 of this subscriber and the gate 77 is open. The first positive pulse 101 received through wire 75 and passing through gate 77, which is the only one that is open, puts the next trigger circuit 72 into operation; the effect of this is to produce, a very short instant after, the resetting to rest of trigger circuit 71 and unblocking the next gate 78 for the next positive pulse. The state of the ring of trigger circuits is then, the same as before, shifted one row towards the right and the connection on which the controlling pulse is found is no longer 19 but the next one 19'. The pulses are distributed successively over all the connections such as 19 in synchronism with the rhythmic operation of the pulse generator 23 in the central office. When the last trigger circuit of the succession is in the position of operation, a negative pulse 101 is normally received, the effect of which is to ensure the resetting to rest of all the trigger circuits with the exception of the first, the trigger circuit 71, which is reset in the position of operation, thus denoting the subscriber No. 00 of the fifty.

Fig. 5 represents the principle of the scanning device 54 which, as has been seen, receives from the gate 52, through the wire 81, a fine connection-control pulse 105 when the trigger circuit 50 is in operation as the result of the firing of the crosspoint 13 associated with the concentrator trunk 15.

The time interval in which the connection-control pulse 103 is received by the detector 49 and, consequently, in which the trigger circuit 50 is put into operation is chiefly characteristic of the number of the subscriber connected in the concentrator considered, the phase of the synchronizing pulses 101 of this stage being chosen so that one is assured that the operation of trigger circuit 50 lasts at least up to the time of occurrence of the pulse 104 relating to the number of the concentrator considered. It is to be borne in mind that it is the pulse 104 that resets the trigger 50 and consequently the output pulse of trigger 50 ends at 103'. The pulse 105 passing through the gate 51 and 52 is really characteristic both of the number of the subscriber and of the number of the concentrator considered among the hundred (concentrator No. 5 in the case of Fig. 1). The pulse 105, which is propagated on the wire 81 therefore characterizes, entirely by its time interval, the number of the subscriber among the five thousands who has just been connected. There remains to be known, in order to define entirely the connection made, the concentrator trunk-line number in the concentrator which is being used for the communication. The scanning device, which supplies this indication to the internal central office, comprises, on the one hand, the set of a thousand gates such as 52 which have been collected in Fig. 5 into a single group 83, a decoder 54 and a set of four marking trigger circuits 84 to 87 forming a counter 109. In the group 83, each column of gates 52 relates to a given concentrator and each line of gates 52 relates to a concentrator trunk number. The generator giving the pulses 104, which identify the several concentrators, is indicated at 88. It may be constituted by a ring counter 118 and a diode matrix coder 110 distributing on a hundred output terminals $53_1$ to $53_{100}$ pulses of a few microseconds having a recurrence period of 20 $\mu$s. The function of the generator 88 is to open successively the gates 52 of the concentrators. At a given instant, no pulses can be found on more than one of the ten gates 52 which are connected to a wire 53, since, as the instant in question is located in a major cycle relating to the number of a particular subscriber, that subscriber can be connected only with a single one of the ten concentrator trunk circuits 29 of his concentrator. In the same way, pulses cannot be found on more than one of a hundred gates 52 which are connected to a wire 81, since each relates to a different concentrator. Consequently, only a single output pulse can be found at a time on one of the ten wires such as 81. Each of the ten wires 81 is characteristic of the trunk-circuit number in the concentrator used.

The connection control pulse of the subscriber No. 02 is represented at 103 and the corresponding pulse at the output of the trigger circuit 50 is represented at 103' in Fig. 1, line *d*.

The identification pulses of a given concentrator, concentrator No. 5, are represented at 104 in Fig. 1, line *e*.

The fine connection control pulse of subscriber No. 02 in concentrator No. 5 is represented at 105 in Fig. 1, line *f*.

If the connection control pulse 103 arrives through the lead 82 corresponding to the second trunk line of concentrator No. 5, only the gate marked 52 in Fig. 5 will become open at the instant of coincidence of the signal 103 and the pulse 104, and a fine pulse 105 for controlling the connection will be obtained on the wire marked 81 on Fig. 5 (second wire from the top) which characterizes the second trunk line.

The diode decoder 54 distributes the pulse 105 that arrives on one wire among ten over one or more of four wires which lead to the trigger circuits 84 to 87, forming the counter 109. The cabling of the diodes is effected in such a manner that the position taken by the four trigger circuits 84 to 87 represents, in a binary code for example, the number of the concentrator trunk line in the concentrator used. In the example described, the trigger circuit 86 comes into operation; this denotes the second concentrator trunk line.

The seven triggers 111 to 117 of generator 88 form a binary counter 118, allowing the number of the concentrator used which is comprised between 1 and 100 to be translated into binary numeration.

A third binary counter 119 comprising six triggers 121 to 126 and controlled by the resetting pulses of the counter 118 allows the number of the subscriber (comprised between 00 and 49) to be translated into binary numeration.

The instantaneous information, supplied by the counters 109, 118 and 119, supplies all the necessary information to the central office switching network in order to know the number of the subscriber, the number of the concentrator and the number of the trunk line relating to said concentrator which have just been connected. The detailed description of the employment of this information by the electronic central office is not within the scope of the present invention.

The device 74 for scanning the condition of the loops of the subscribers' lines represented in Fig. 6 has a constitution which is very similar to that of the scanning device comprising the matrix 83 and the decoder 54. It comprises essentially a rectangular switching arrangement 74 of a thousand gates such as 89, each receiving one of the wires such as 90 coming from the gates 70 of the trunk-line circuits 29 and, through a connection such as 53, identification pulses of the concentrators.

The signalling transmitted over the connections such as 90 signify that the subscriber is effecting loop breakages with his dial or that he has just hung up.

It is necessary for the central office to analyse, at particular instants, the condition of the loop of every subscriber so as to be able to deduce the numbers formed on the dial. In order to know the location of the ten subscribers who may be connected to the central office by the same concentrator, it is sufficient to cause the generator 92 to transmit a pulse 104 to the wire 53 corresponding to this concentrator in order to collect, over the set of ten wires 93, pulses which characterize the state of the corresponding subscribers; this information will be used by the central office for making the connection.

Before proceeding to the detailed description of the operation of the concentrator, it will be shown that the gates 3 of the subscribers, which are assumed to be constituted by saturable-core transformers, are quite capable of taking four distinct states referred to in connection with Fig. 7.

Fig. 7 represents the points of operation on an "ampere-turns of energization-induction" diagram, which are used in the four states for each of the saturable-core transformers 5 and 6. For each of these states or service conditions which will be called respectively:

Idle or line disengaged,
Loop closed, not connected or calling line,
Loop closed, connected or line in use,
Loop open, connected (dialling or hanging-up), the two hysteresis cycles of the transformers 5 and 6 have been represented by plotting, in abscissas, the excitation ampere-turns and, in ordinates, the induction. The black point represents, on each of these diagrams, the polarization point in each state in the absence of subscriber-identifying pulses 102 on the lead 19. The thick line represents the cycle described during the subscriber-identifying pulse. The third column of the figure represents the resultant signal obtained on the lead 11.

In the idle condition as the subscriber's loop is open and not connected, the normal polarization obtained by a weak direct current, which passes through the connection 19 to a resistor and a negative source in the pulse generator 18, is such that the cycle described during the subscriber-identifying pulse remains, for the transformer 5, in the region of saturation and therefore does not give rise to any signal but enables the transformer 6 to describe a hysteresis cycle, thus supplying the positive two-sided connecting pulse 106 to the lead 11 (Fig. 7, line *a*).

When the subscriber lifts his handset and closes his loop, the microphone-feed current which passes through the primary windings of the transformer 5, displaces the normal polarization point to the right, whilst nothing is changed for the transformer 6. At the instant at which the pulse is produced on the lead 19, the polarizations are such that the two transformers describe simultaneously a hysteresis cycle, thus uspplying to the connection 11 a one-sided connecting pulse 107 of an amplitude which is about double than that of the two-sided connecting pulse (Fig. 7, line *b*).

After the firing of the crosspoint 13 (connected closed loop), a direct feeding current passes through the leads 11 and 12 as well as through the secondaries of the transformers 5 and 6 in series. The polarization points are then both displaced to the right in the second region of saturation and the pulses that arrive through the lead 19 no longer have any effect (Fig. 7, line *d*).

When the subscriber's loop is opened, for example by the breakage of his dial or because the called subscriber has not yet lifted up his handset, and the line is connected in the concentrator, the interruption of the microphone-feed current which results therefrom reduces the energization ampere turns of the transformer 5 without influencing those of the transformer 6. As the polarization point of the transformer 5 is, at that instant, in the vicinity of the saturation knee of the hysteresis curve, the pulses are practically without action, whilst, on the contrary, the signal having the loop frequency *f* injected into the fourth winding of the transformer, has an amplitude which is sufficient for producing variations of induction which are found on the lead 11. The subscriber's gate 3 therefore allows the signal having the loop frequency *f* to pass only in this case (Fig. 7, line *c*).

It will also be assumed here that the crosspoints used possess the known properties of cold-cathode gas diodes, namely that they can be made conductive by means of a pulse the amplitude of which exceeds certain threshold value and are blocked by means of a pulse having its amplitude in the opposite direction and of a sufficient duration, and also that, when a plurality of diodes, which possess a common load impedance, are simultaneously energized, only one of these diodes can be kept in the fired condition.

The detailed operation in the case of a starting communication is then as follows:

When the subscriber 1, on lifting his handset, loops the line 2 to the impedance of his telephone set, the gate 3 delivers, to the lead 11, a one-sided connecting pulse 107 at the instant at which it receives from the generator 18, over the connection 19, the subscriber-identifying pulse 102 at the time interval that is characteristic of the number of the subscriber in the concentrator.

The amplitude of this pulse exceeds the firing threshold value of the gas diodes 13 which are connected to an available trunk line 15, that is to say to a common resistor 16 which has not already been traversed by a feed current passing through one of the fifty diodes connected to the trunk line considered.

These gas diodes which have a common load impedance that is constituted by the resistance 17, block one another and only one of them can pass to the completely conductive condition. On firing, the diode 13 produces a sharp increase of voltage at the upper terminal of the common resistor 16, thus rendering the corresponding trunk line unavailable for other connections. This increase of voltage, which is differentiated by the condenser 47, is transmitted, in the form of a connection-control pulse 103, to the tap of the transformer 14 and, in parallel, to the two-wires 15 of the trunk line up to the tap 31. After having passed through the rectifying diode 48, this pulse is detected and regenerated by the pulse-detector 49 and, finally, triggers the trigger circuit 50. The phase displacement between the rhythm of the central office and the subscriber-identifying pulses from the generator 18, taking into account the propagation times, on the one hand, and the mean times of starting the gas diodes 13, on the other hand, should be such that the triggering of the trigger circuit 50 is produced slightly before the minor cycle of the concentrator which forms part of the major cycle of the subscriber considered but after the same minor cycle which forms part of the preceding major cycle. The adjustment margin, which is thus slightly less than two milliseconds, is very wide for electronic devices. In particular, it enables the central office to be prepared for the recording of the identity of the calling subscriber and the trunk line of his connecting concentrator. The details of these preliminary operations are outside the scope of the present invention.

When a minor cycle that is characteristic of the concentrator is arrived at, the pulse-generator 88 supplies a concentrator-identifying pulse 104 to the wire 53. This pulse passes through the gates 51 and 52 which are open and produces three effects: it starts the trigger circuit 57 which opens the gate 59 to the frequency $F_N$ of the dial tone, which tone is received by the calling subscriber; it passes to the wire 81 and through the diode decoder 54, puts one or more trigger circuits 84 to 87 into operation so as to record on the counter 109 the number of the trunk line of the concentrator which has been used for ensuring the connection and, finally, it resets the trigger circuit 50 to rest; the effect of this is to reclose the gates 51 and 52. When the subscriber operates his dial, every breakage of the loop, on changing the point of polarization of the transformer 5, allows the passage of the loop frequency *f* through the diode 13, transformer 14 and the trunk line 15. This loop frequency, which is picked up by the secondary winding 313 of the transformer 30, is detected by the detector 55 into a direct current potential on the lead 56. The commencement of the first dialling pulse received resets the trigger circuit 57 to rest and stops the transmission of the dial tone by closing the gate 59.

The gate 70 being open since the trigger circuit 58 is at rest, the direct current potential is carried to the connection 90 and is, consequently, available for being analyzed by the central office by means of the scanning device 74 at the time that is suitable for it. For this purpose, it is sufficient for it to transmit, by means of the pulse-generator 92, a pulse to the lead 53 that corresponds to the concentrator, in order to find, on the lead 93 corresponding to the number of the trunk line, the information that is necessary to him.

When the central office decides that the number dialed on the dial has been received completely and that it has the necessary elements for making the connection, it proceeds to the connection of the called subscriber through a trunk line of the concentrator of that called subscriber, as will be seen hereinafter; then, having recognized the number of the trunk line chosen on the called side, it proceeds to the connection of the two groups 34 of the internal selection stages by means of the marking and connecting device 36, the detailed description of which is outside the scope of this invention.

The calling subscriber can then perceive, through the selector stages 34 and a junctor 43 in the central station, the call frequency F transmitted by the trunk line circuit 29 of the called side. At the same time, its own trunk line circuit detects, by means of the tuned detector 65, the return-of-call supervision frequency and transmits it to the device 68 through the gate 67 which is open since the trigger circuit 58 is at rest.

When the call-return signal at the frequency F′ stops owing to lifting of his handset by the called subscriber, the device 68 transmits to the connection 69 a pulse which will be called "reply pulse" and which is used by the central office for all useful purposes, especially for signalling the commencement of the period of communication to be charged for, effecting the metering of effective traffic etc.

The retransmission of the supervision of the reply from the called subscriber is interesting for a number of reasons and especially for enabling the pricing operations to be charged to the calling subscriber without necessitating a memorizing of the communication established between the two subscribers and also in the case in which the ingoing line is constituted by an interurban circuit for easily retransmitting the supervision to the call office which must carry out these pricing operations.

When the subscriber hangs up at the end of the communication, the breakage of his loop produces the same succession of phenomena as during the breakage by the dial, and the central office makes use, in the same way, of the means for testing the hanging-up. It distinguishes a hanging-up from a dial pulse by ascertaining that the direct potential on lead 90 has a duration that is greater than 200 milliseconds for example, by means of a delay device which is not described here.

When the central office, on testing the presence of information of sufficient duration on the connection 90, ascertains that the subscriber has hung up and decides to cut him off, it transmits, by means of the pulse generator 33, to the particular connection which leads to the amplifier 32 of the trunk-line circuit considered, a positive disconnection pulse, the amplitude and the duration of which are sufficient for producing the extinction of the crosspoint used through the intermediary of the trunk line 15 and of the transformer 14, and also of the crosspoints belonging to three internal selection stages 34 up to the junctor 43 through the intermediary of the transformer 30.

This disconnection pulse has no effect on the tap 31 of the transformer 30 and, consequently, there is no risk of producing a false signal on the detector 49.

The detailed operation in the case of an arriving communication is as follows:

The central office having united all the information that is necessary for the purpose of locating the position of the called line and, in particular, the number of the concentrator on which it depends, waits until a major cycle, that corresponds to the number of the subscriber in his concentrator is arrived at and then transmits, by means of the pulse generator 39, through the trunk lines relating to the concentrator considered, a negative two-sided connecting pulse. This pulse has two objects; it puts into operation the memory trigger circuit 42 which is associated with the concentrator equipment in the central office and the object of which is to recall that the connection control pulse, which one is prepared to detect, relates to a called subscriber; it is then, through the resistors 40, distributed to all the taps 31 of the trunk-line circuits, flows in parallel on the two wires 15 of the trunk lines and through the condenser 47 and then appears at the terminals of the resistors 16.

As at this precise instant, the gate 3 of the called subscriber is delivering a two-sided positive connecting pulse to the lead 11, it is seen that all the diodes 13, which correspond to available trunk lines, find, at their terminals, a difference of potential which is the sum of the amplitudes of the two two-sided connecting pulses of opposite polarities and, consequently, exceeds their firing threshold.

However, as all these diodes have a common load impedance constituted by the resistor 17, only one can fire while the others remain extinguished. The diode 13 which is conductive discharges into the resistors 17 and 16, thus marking the busy condition of the corresponding called line and trunk line. It also produces a sharp increase of potential at the upper terminal of the resistor 16 which, having been differentiated by the condenser 47 and retransmitted in parallel by the two wires 15, is detected by the pulse detector 49 in the same way as during the connection of a calling line to an available trunk line. The same operations of identifying the trunk line chosen take place and the central office can thus know the incoming trunk line and the outgoing trunk line to be connected together. It proceeds to the connection as has hereinbefore been seen.

However, the effects of the operation of the trigger circuit 50 at the interior of the trunk line circuit are somewhat different from the case of the connection of a calling line. The pulse 105 transmitted by the gate 51 cannot put the trigger circuit 57 into operation because the latter is kept in the position of rest by the direct current potential which is found on the connection 56 as the result of the detection of the loop frequency $f$ by the detector 55 (because the called subscriber loop is open). On the other hand, this pulse passes through the gate 64 which has been opened by the memory trigger circuit 42 and puts the trigger circuit 58 into operation; at the same time, it produces the resetting of the trigger circuit 42 to rest and, a very short instant later, the closing of the gate 64.

In its position of operation, the trigger circuit 58 opens the gate 60 to the passage of the cadenced call frequency F and of the continuous call-return supervision frequency F′ generated by the common generator 62. It is assumed here that the subscriber's set is equipped with an acoustic bell system which can be energized by the audio frequency F at a rather low power level of the order of a few milliwatts. The called subscriber is thus rung up and his correspondent receives the audio frequency F which is being propagated through the chain as a call-return frequency. At the same time, as has hereinbefore been seen, his trunk line circuit detects the call-return supervision rectified frequency F′ which is not audible but is also propagated through the internal stages of the central station.

When the called subscriber lifts his handset, he produces a modification of the characteristics of his gate 3 which, as has hereinbefore been described, is such that all transmission of signallings by the line is stopped. The stoppage of the detection of the loop frequency therefore produces the elimination of the rectified voltage put on the wire 56 by the detector 55, and this interruption is translated by the device 63 into the form of a pulse which resets the trigger circuit 58 to rest, closing the gate 60 and consequently stopping the transmission of the frequencies F and F′.

Since, during the transmission of the frequency F′, the detector 65 of the same trunk line circuit put a rectified voltage on the wire 66, the precaution should be taken not to open the gate 67 too soon after having closed the gate 60 at the instant of the triggering of 58. For this purpose, a slight delay is produced in the opening of the gate 67.

During the time of the communication, all the devices used are in the condition of rest, with the exception of the crosspoints of the calling and called subscribers' lines with the selected trunk-lines and the crosspoints in use in the internal selection stages of the central station.

The freeing of the portion of chain located between the called subscriber's line and the junctor 43 when the subscriber replaces his handset is produced as has hereinbefore been indicated.

The concentrator, which operates in connection with an electronic central office and forms the subject matter of the present invention, has been described in the present specification in the form of a well-defined embodiment. However, it is to be understood that numerous modifications are possible, especially in the choice of the individual devices used in the circuits. These modifications, which the person skilled in the art will easily devise, come within the scope of the invention.

What I claim is:

1. A telephonic concentrator arrangement for allowing a number of telephone subscribers' lines to be connected to a central station by a smaller number of trunk lines comprising a matrix of crosspoints having as many input leads as subscribers' lines connected to the concentrator and as many outgoing leads as trunk lines between the concentrator and the central station, a plurality of subscribers' gates, each relating to a given subscriber's line and being formed of at least two saturable core transformers in series located between and coupling said given subscriber's line and the corresponding input lead of the matrix of crosspoints, a subscriber identification pulse distributor having a number of outputs equal to the number of subscribers and producing on said outputs pulses the time-intervals of which in a recurrent cycle are characteristic of the numbers of the subscribers, connecting means between said pulse distributor outputs and said subscribers' gates, a signalling frequency generator and connecting means between said signalling frequency generator and said subscribers' gates.

2. A telephonic concentrator arrangement for allowing a number of telephone subscribers' lines to be connected to a central station by a smaller number of trunk lines comprising a matrix of crosspoints having as many input leads as subscribers' lines connected to the concentrator and as many outgoing leads as trunk lines between the concentrator and the central station, a plurality of subscribers' gates each relating to a given subscriber's line and being formed of a first transformer, a saturable core second transformer having three primary windings and one secondary winding, polarizing means responsive to the opening of the loop of said given subscriber's line displacing the operation point of said second transformer to render it unoperative when unsaturated and to prevent its complete saturation, a saturable core third transformer, feeding means for the subscribers' lines connected to said lines through the primary winding of the first transformer and the first primary winding of the saturable core second transformer in series, a subscriber identification pulse distributor having a number of outputs equal to the number of subscribers each output being connected to the primary winding of the third transformer in series with the second primary winding of the second transformer of a subscriber's gate said distributor producing on said outputs identification pulses the time-intervals of which in a recurrent cycle are characteristic of the numbers of the subscribers, a signalling frequency generator having an output connected to the third primary winding of said second transformer, the said input leads of said matrix of crosspoints being respectively connected to the secondary winding of the first, second and third transformers in series with the subscribers' gates, the saturation of the second and third transformers of a given subscriber's gate being thus responsive to the operation of a crosspoint connected to said subscriber's gate through the corresponding input lead, and the said outgoing leads of said matrix being connected to the trunk lines whereby the subscriber's gate is adapted to occupy four distinct states according to the service condition of the subscriber's line, namely a first state corresponding to a subscriber's handset on hook and a line not connected to the crosspoint matrix in which the second transformer is unoperative and the third transformer unsaturated and the subscriber's identification pulse gives rise through the gate to a small amplitude pulse, a second state corresponding to a subscriber's handset off hook and a line disconnected from the crosspoint matrix in which the second and third transformers are both unsaturated and operative and the subscriber's identification pulse gives rise through the gate to a large amplitude pulse, a third state corresponding to a subscriber's handset off hook and a line connected to the crosspoint matrix in which the second and third transformers are both saturated and the subscriber's identification pulse gives rise through the gate to a zero signal and a fourth state corresponding to a subscriber's handset on hook and a line connected to the crosspoint matrix in which the second transformer is almost saturated and the third transformer quite saturated and the signalling frequency gives rise to a characteristic open loop signal.

References Cited in the file of this patent

UNITED STATES PATENTS

| | | |
|---|---|---|
| 2,724,746 | Bruce et al. | Nov. 22, 1955 |
| 2,812,385 | Joel et al. | Nov. 5, 1957 |